(12) United States Patent
Kang et al.

(10) Patent No.: US 9,222,488 B2
(45) Date of Patent: Dec. 29, 2015

(54) SYSTEM AND METHOD FOR CONTROLLING ENGINE REVOLUTIONS FOR HYBRID CONSTRUCTION MACHINE

(71) Applicant: VOLVO CONSTRUCTION EQUIPMENT HOLDING SWEDEN AB, Eskilstuna (SE)

(72) Inventors: Jong Min Kang, Gyeongsangnam-do (KR); Ahn Kyun Jung, Gyeongsangnam-do (KR); Jae Hong Kim, Gyeongsangnam-do (KR); Chun Han Lee, Gyeongsangnam-do (KR); Jung Sun Jo, Gyeongsangnam-do (KR)

(73) Assignee: VOLVO CONSTRUCTION EQUIPMENT HOLDING SWEDEN AB, Eskilstuna (SE)

( * ) Notice: Subject to any disclaimer, the term of this patent is extended or adjusted under 35 U.S.C. 154(b) by 0 days.

(21) Appl. No.: 14/054,268

(22) Filed: Oct. 15, 2013

(65) Prior Publication Data

US 2014/0086757 A1 Mar. 27, 2014

Related U.S. Application Data

(62) Division of application No. 12/819,495, filed on Jun. 21, 2010, now Pat. No. 8,567,549.

(30) Foreign Application Priority Data

Jul. 29, 2009 (KR) ........................ 10-2009-0069576

(51) Int. Cl.
*B60W 10/06* (2006.01)
*F15B 7/08* (2006.01)
(Continued)

(52) U.S. Cl.
CPC ... *F15B 7/08* (2013.01); *B60K 6/48* (2013.01); *B60W 10/08* (2013.01); *B60W 10/30* (2013.01);
(Continued)

(58) Field of Classification Search
CPC ..... B60W 20/40; B60W 10/06; B60W 10/08; B60W 10/30
USPC .................................................. 180/305, 307
See application file for complete search history.

(56) References Cited

U.S. PATENT DOCUMENTS 6,062,332 A 5/2000 Stephenson et al.
6,648,091 B2 11/2003 Tanabe
(Continued)

FOREIGN PATENT DOCUMENTS

CN 1781790 A 6/2006
CN 101165282 A 4/2008
(Continued)

OTHER PUBLICATIONS

Office Action dated Mar. 1, 2013 for U.S. Appl. No. 12/819,495.
(Continued)

*Primary Examiner* — Jeffrey J Restifo
(74) *Attorney, Agent, or Firm* — Ladas & Parry LLP

(57) ABSTRACT

A system and method for controlling engine revolutions for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, an energy storage device which is charged with electric energy generated by the motor-generator and which supplies the electric energy for motor operation of the motor-generator, a torque detection unit for detecting an output torque of the hydraulic pump that is required to drive the hydraulic actuator, and a hybrid control unit for controlling the motor operation of the motor-generator to supplement the engine output if the change of the output torque of the hydraulic pump exceeds a predetermined level and it is determined that an engine revolution drop will occur.

1 Claim, 7 Drawing Sheets

(51) Int. Cl.
*B60K 6/48* (2007.10)
*B60W 10/08* (2006.01)
*B60W 10/30* (2006.01)
*E02F 9/20* (2006.01)
*E02F 9/22* (2006.01)
*B60W 20/00* (2006.01)
*F16H 59/68* (2006.01)

(52) U.S. Cl.
CPC ............ *E02F 9/2075* (2013.01); *E02F 9/2246* (2013.01); *B60L 2240/423* (2013.01); *B60W 20/00* (2013.01); *B60W 2710/0661* (2013.01); *B60W 2710/083* (2013.01); *F16H 2059/6884* (2013.01); *Y02T 10/6221* (2013.01); *Y02T 10/642* (2013.01); *Y10T 477/23* (2015.01)

(56) References Cited

U.S. PATENT DOCUMENTS

| | | | |
|---|---|---|---|
| 6,708,787 B2 * | 3/2004 | Naruse et al. | 180/53.8 |
| 6,820,356 B2 * | 11/2004 | Naruse et al. | 37/348 |
| 6,962,050 B2 | 11/2005 | Hiraki et al. | |
| 7,086,226 B2 * | 8/2006 | Oguri | 60/414 |
| 7,143,859 B2 * | 12/2006 | Ohtsukasa | 180/307 |
| 7,273,124 B2 | 9/2007 | Tatsuno et al. | |
| 7,506,717 B2 | 3/2009 | Tatsuno et al. | |
| 7,525,206 B2 * | 4/2009 | Kagoshima et al. | 290/40 C |
| 7,745,947 B2 * | 6/2010 | Komiyama et al. | 290/40 C |
| 7,890,237 B2 | 2/2011 | Kuwahara et al. | |
| 8,042,331 B2 | 10/2011 | Schultz et al. | |
| 8,286,748 B2 | 10/2012 | Takahashi et al. | |
| 8,316,983 B2 | 11/2012 | Shirao | |
| 8,321,095 B2 * | 11/2012 | Kawasaki et al. | 701/50 |
| 8,322,481 B2 | 12/2012 | Satake et al. | |
| 8,326,745 B2 | 12/2012 | Yoshida et al. | |
| 8,333,131 B2 | 12/2012 | Legner | |
| 8,408,341 B2 * | 4/2013 | Dalum et al. | 180/65.22 |
| 8,548,661 B2 * | 10/2013 | Wu | 701/22 |
| 8,567,549 B2 * | 10/2013 | Kang et al. | 180/305 |
| 8,606,442 B2 * | 12/2013 | Kang et al. | 701/22 |
| 8,739,906 B2 * | 6/2014 | Kawashima | 180/65.22 |
| 8,839,897 B2 * | 9/2014 | Moore | 180/165 |
| 8,844,660 B2 * | 9/2014 | Kawashima et al. | 180/65.29 |
| 8,922,228 B2 * | 12/2014 | Ono | 324/720 |
| 8,924,100 B2 * | 12/2014 | Imura et al. | 701/50 |
| 8,943,820 B2 * | 2/2015 | Carlton et al. | 60/431 |
| 2010/0036568 A1 | 2/2010 | Filla | |
| 2010/0089050 A1 | 4/2010 | Filla | |
| 2010/0332088 A1 | 12/2010 | Okano et al. | |

FOREIGN PATENT DOCUMENTS

| | | |
|---|---|---|
| JP | 2002-275945 A | 9/2002 |
| JP | 2004-11502 A | 1/2004 |
| JP | 2006-275019 A | 10/2006 |
| JP | 2009-13632 A | 1/2009 |
| WO | 2008/041890 A1 | 4/2008 |
| WO | 2008/041892 A1 | 4/2008 |
| WO | 2009/005094 A1 | 1/2009 |

OTHER PUBLICATIONS

Non-English Action dated Aug. 28, 2014 for Chinese Application No. 201010218513.1 with an English translation.
European Search Report dated Jan. 2, 2014 for EP Application No. 10167964.5-1712.
Non-English Action dated Dec. 27, 2013 for Chinese Application No. 201010218513.1 with an English translation.
Non-English Action for Korean Application No. 10-2009-0069576.
Non-English Action for Japanese Application No. 201-162708.
Patent Abstracts of Japan English abstract of JP 2004-11502 A.
Espacenet English abstract of CN 1781790 A.
Espacenet English abstract of CN 101165282 A.
Patent Abstracts of Japan English abstract of JP 2006-275019 A.
Patent Abstracts of Japan English abstract of JP 2009-13632 A.
Patent Abstracts of Japan English abstract of JP 2002-275945 A.

* cited by examiner

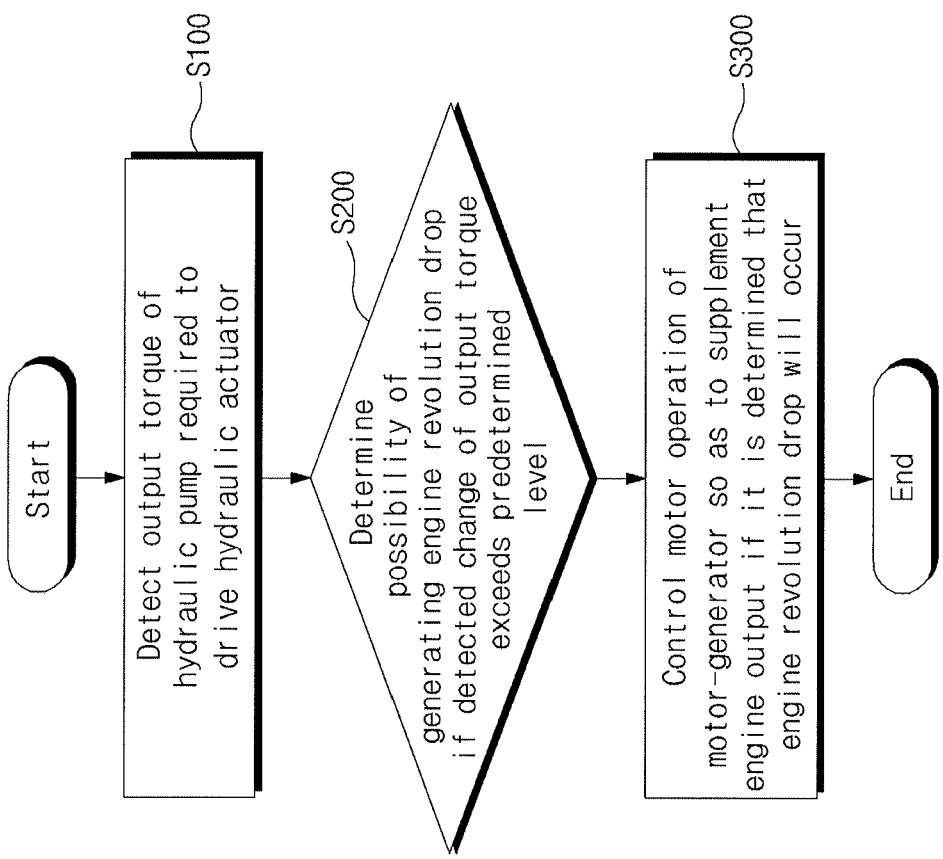

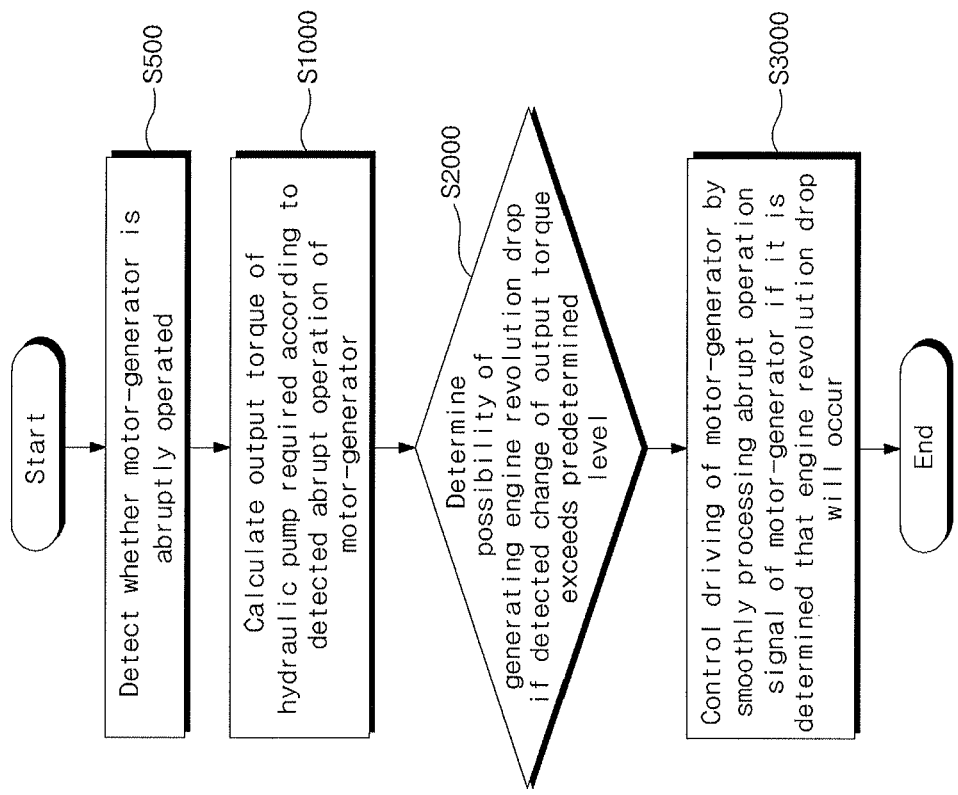

SYSTEM AND METHOD FOR CONTROLLING ENGINE REVOLUTIONS FOR HYBRID CONSTRUCTION MACHINE

CROSS-REFERENCE TO RELATED APPLICATION

Related Application

This application is a divisional of application Ser. No. 12/819,495 filed on Jun. 21, 2010, the entire contents of which are incorporated herein by reference.

This application is based on and claims priority from Korean Patent Application No. 10-2009-69576, filed on Jul. 29, 2009 in the Korean Intellectual Property Office, the disclosure of which is incorporated herein in its entirety by reference.

BACKGROUND OF THE INVENTION

1. Field of the Invention

The present invention relates to a system and method for controlling engine revolutions for a hybrid construction machine. More particularly, the present invention relates to a system and method for controlling engine revolutions for a hybrid construction machine, which can prevent the occurrence of engine revolution drop in a hybrid construction machine.

2. Description of the Prior Art

In general, a construction machine such as an excavator in the related art has a hydraulic driving system which drives a hydraulic pump by a fuel engine and drives an actuator by hydraulic pressure.

FIG. 1 is a necessary torque output relationship diagram of an excavator system in the related art. As illustrated in FIG. 1, in a hydraulic excavator in the related art, an opening area of a main control valve (MCV) 7 is adjusted in accordance with an output of a pilot valve 6 through a user's manipulation of a lever 5. Hydraulic fluid discharged from a hydraulic pump 13 is transferred to respective hydraulic systems with its flow rate adjusted in accordance with the opening area of the MCV 7. Since the driving of the hydraulic pump 13 is performed by a fuel engine 10, the efficiency thereof is relatively low.

In the construction machine such as the hydraulic excavator in the related art, it is sometimes required to perform working as greatly changing an engine output so as to cope with great load change, and it is required to seek improvement of mileage by effectively utilizing the engine output. Accordingly, a hybrid technology using an electric motor-generator that is adopted in a hybrid vehicle has been planned to be applied to an excavator. That is, a hybrid construction machine, such as a hybrid excavator, in which an engine is connected to an electric motor-generator, has been proposed. According to the hybrid construction machine, in the case of performing a light-load operation, the motor-generator is operated to generate power to charge a battery using a portion of the engine output, while in the case of performing a heavy-load operation, electric energy is provided from the battery to supplement the engine.

An electric motor-generator is attached to the engine of the hybrid excavator. If this electric motor-generator is abruptly operated, engine revolutions (i.e. revolutions per minute (RPM)) may be lowered to cause the occurrence of an engine revolution (RPM) drop. Although the engine returns to its original revolutions by a self-control system, the working performance is lowered in this process.

Also, the lowering of the engine revolution occurs when the load is greatly changed, for example, the load is abruptly increased, during operation of the construction machine.

SUMMARY OF THE INVENTION

Accordingly, the present invention has been made to solve the above-mentioned problems occurring in the prior art while advantages achieved by the prior art are maintained intact.

The present invention proposes to improve an engine revolution (RPM) drop which occurs during the operation of a hybrid excavator or due to an abrupt operation change of a motor-generator attached to an engine.

The present invention also proposes to provide a system and method for controlling engine revolutions for a hybrid construction machine, which can improve an engine revolution (RPM) drop by supplementing an engine output through operation of a motor-generator as a motor when the RPM drop occurs.

The present invention also proposes to provide a system and method for controlling engine revolutions for a hybrid construction machine, which can smoothly change and process a driving signal of a motor-generator so as to prevent the occurrence of an abrupt change of engine revolutions (RPM) due to an abrupt operation of the motor-generator attached to an engine of the hybrid construction machine.

In one aspect of the present invention, there is provided a system for controlling engine revolutions for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator, which further includes a torque detection means for detecting an output torque of the hydraulic pump that is required to drive the hydraulic actuator; and a hybrid control means for controlling the motor operation of the motor-generator so as to supplement the engine output if the change of the output torque of the hydraulic pump detected by the torque detection means exceeds a predetermined level and it is determined that an engine revolution drop will occur.

In the system for controlling engine revolutions according to a preferred embodiment of the present invention, the hybrid control means controls the motor operation of the motor-generator so as to supplement the engine output if the change of the output torque of the hydraulic pump exceeds the predetermined level due to an abrupt increase of load and it is determined that the engine revolution drop will occur.

The system for controlling engine revolutions according to a preferred embodiment of the present invention further includes a driving control means for controlling power generation or the motor operation of the motor-generator; and an abrupt operation detection means for detecting whether the motor-generator is abruptly operated; wherein the hybrid control means smoothly processes an abrupt operation signal of the motor-generator and supplies the processed signal to the driving control means if the change of the output torque of the hydraulic pump that is required according to the abrupt operation of the motor-generator detected by the abrupt operation detection means exceeds the predetermined level and it is determined that the engine revolution drop will occur.

In another aspect of the present invention, there is provided a method for controlling engine revolutions in a control system for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator, the method for controlling engine revolutions includes a torque detection step of detecting an output torque of the hydraulic pump that is required to drive the hydraulic actuator; a drop determination step of determining the possibility of generating an engine revolution drop if the change of the output torque of the hydraulic pump detected in the torque detection step exceeds a predetermined level; and a hybrid control step of controlling the motor operation of the motor-generator so as to supplement the engine output if it is determined that the engine revolution drop will occur in the drop determination step.

In the method for controlling engine revolutions according to a preferred embodiment of the present invention, the drop determination step determines the possibility of generating the engine revolution drop if the change of the output torque of the hydraulic pump exceeds the predetermined level due to an abrupt increase of load during operation.

In still another aspect of the present invention, there is provided a method for controlling engine revolutions in a control system for a hybrid construction machine, including an engine, a hydraulic pump which is driven by the engine to drive a hydraulic actuator with discharged hydraulic fluid, a motor-generator which is driven by the engine to generate electricity and to drive the hydraulic pump as a motor supplementing the engine, and an energy storage device which is charged with electric energy generated by the motor-generator and which supplies the electric energy for motor operation of the motor-generator, the method for controlling engine revolutions includes an abrupt operation detection step of detecting whether the motor-generator is abruptly operated; a torque calculation step of calculating an output torque of the hydraulic pump that is required in accordance with the abrupt operation of the motor-generator detected in the abrupt operation detection step; a drop determination step of determining the possibility of generating an engine revolution drop if the change of the output torque of the hydraulic pump calculated in the torque calculation step exceeds a predetermined level; and a hybrid control step of controlling the motor operation of the motor-generator by smoothly processing an abrupt operation signal of the motor-generator if it is determined that the engine revolution drop will occur in the drop determination step.

As preferred embodiments of the present invention, embodiments according to diverse possible combination of the above-described technical features may be included.

With the above-described construction, the engine revolution (RPM) drop, which occurs during the operation of the hybrid excavator or due to an abrupt operation change of the motor-generator attached to the engine, is prevented from occurring.

Also, the engine revolution (RPM) drop is prevented from occurring by supplementing the engine output through the operation of the motor-generator as a motor when the engine revolution drop will occur due to the operation of the construction machine such as an excavator.

Also, the engine revolution (RPM) drop is prevented from occurring by smoothly changing and processing the driving signal of the motor-generator so that an abrupt change of the engine revolutions does not occur due to the abrupt operation of the motor-generator attached to the engine of the hybrid construction machine.

BRIEF DESCRIPTION OF THE DRAWINGS

The above and other objects, features and advantages of the present invention will be more apparent from the following detailed description taken in conjunction with the accompanying drawings, in which:

FIG. 5 is a flowchart illustrating a method for controlling engine revolutions for a hybrid construction machine according to another embodiment of the present invention; and FIG. 6 is a flowchart illustrating a method for controlling engine revolutions for a hybrid construction machine according to still another embodiment of the present invention.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

First, a system for controlling engine revolutions for a hybrid construction machine according to an embodiment of the present invention will be described.

A control system for a hybrid construction machine will now be described.

Figure 1:
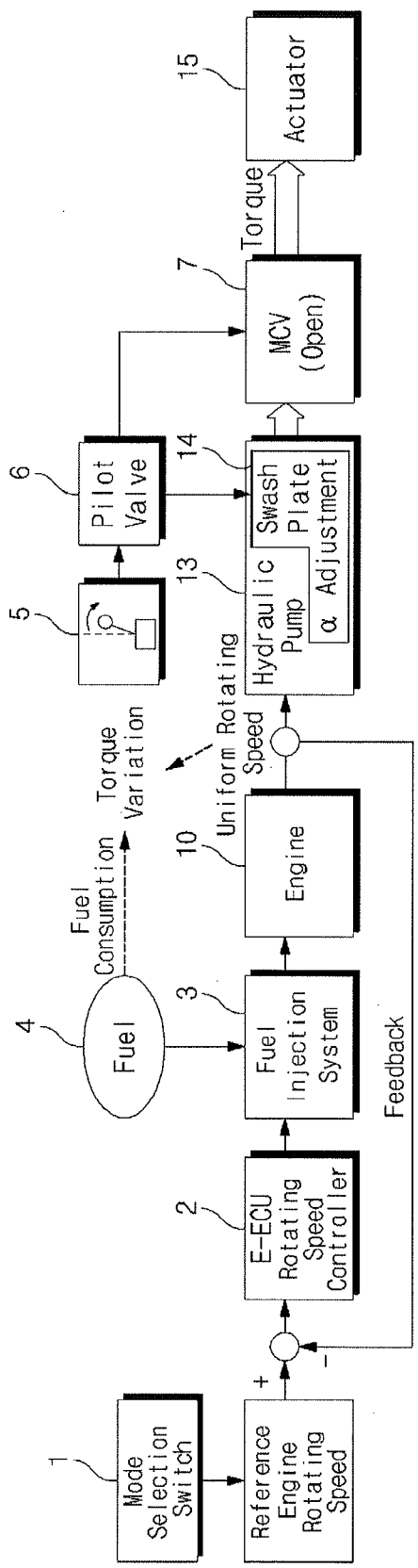
FIG. 1 is a necessary torque output relationship diagram of an excavator system in the related art.
Figure 2:
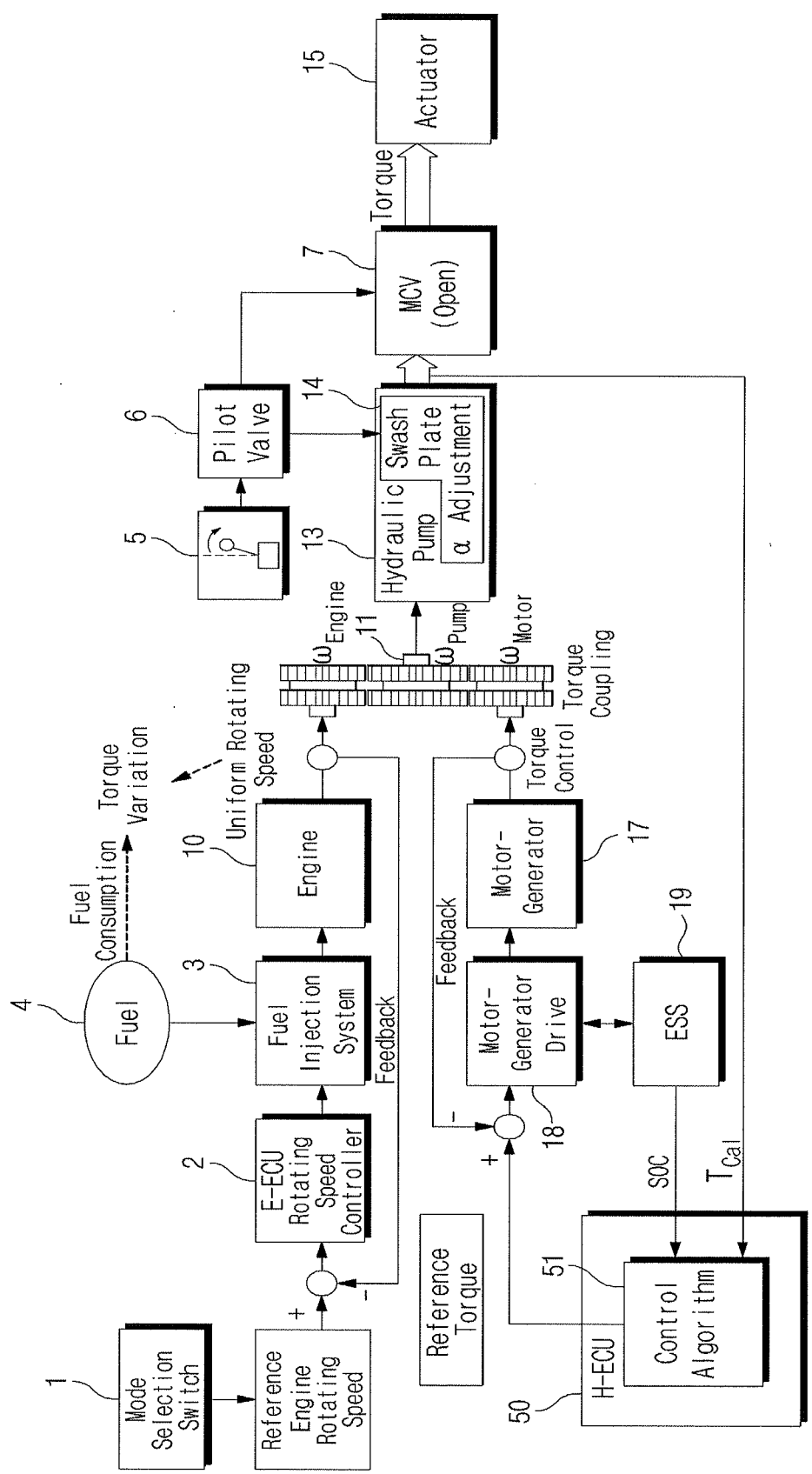
FIG. 2 is a necessary torque output relationship diagram of a control system for a hybrid construction machine according to an embodiment of the present invention.

FIG. 2 is a necessary torque output relationship diagram of a control system for a hybrid construction machine according to an embodiment of the present invention.

Referring to FIG. 2, a control system for a hybrid construction machine includes an engine 10, a hydraulic pump 13 which is driven by the engine 10 to drive a hydraulic actuator 15 with discharged hydraulic fluid, a motor-generator 17 which is driven by the engine 10 to generate electricity and to drive the hydraulic pump 13 as a motor supplementing the engine 10, and an energy storage device, e.g. a battery 19, which is charged with electric energy generated by the motor-generator 17 and which supplies the electric energy for motor operation of the motor-generator 17. A system for controlling engine revolutions for a hybrid construction machine is a control system for reducing the change of the engine revolutions (per minute) in the control system of the hybrid construction equipment.

The driving process of the engine 10 in the hybrid construction machine system will be described. If a work mode, for example, P-mode, H-mode, G1-mode, or F1-mode, is selected by a mode selection switch 1, the engine revolutions, that is, engine revolutions per minute (RPM), is set to 1900 RPM, 1800 RPM, 1700 RPM, 1400 RPM, or the like, and the engine revolutions become reference engine revolutions. If fuel stored in a fuel tank 4 is injected into the engine 10 through a fuel injection system 3, the engine 10 is driven. A hybrid control means 50 receives feedback of torque necessary for the hydraulic actuator 15, that is, the output torque provided from the hydraulic pump 13, and controls power generation or motor operation of the motor-generator 17 through a control algorithm 51. In accordance with the power generation or motor operation of the motor-generator, a necessary output of the existing engine 10 for providing the output torque of the hydraulic pump that is necessary for the hydraulic actuator 15 is determined. In order for the existing engine 10 to provide necessary output, the output revolutions of the engine 10 and a required output or engine output torque are fed back to an electronic control unit (E-ECU) 3. The output torque of the engine 10 is varied by the variation of the fuel injection amount from the fuel tank 4 through the fuel injection system 3 that is controlled by the electronic control unit (E-ECU) 2.

Figure 4:
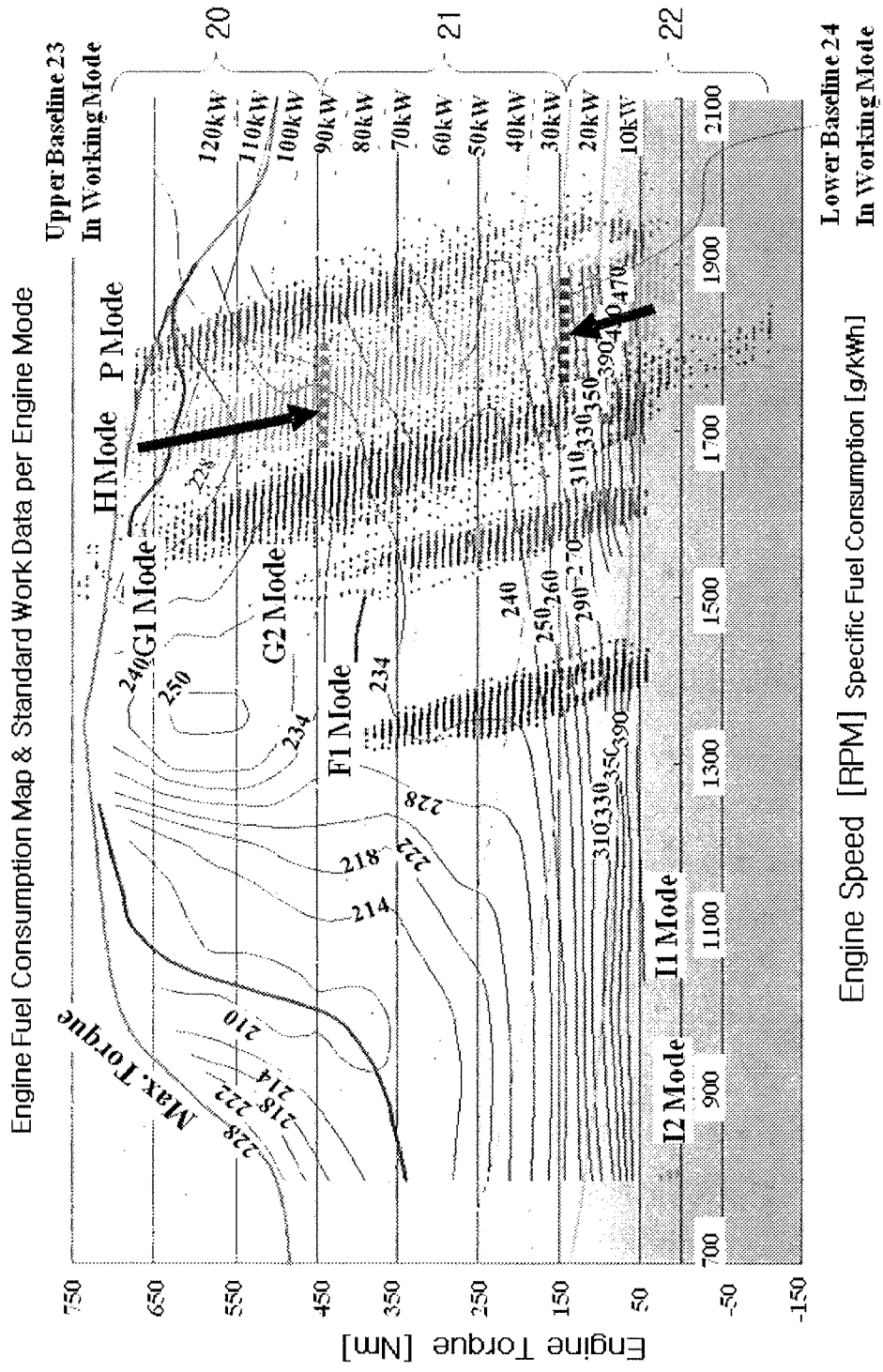
FIG. 4 is a view illustrating the standard work data per engine mode of an excavator.

FIG. 4 is a view illustrating the standard work data per engine mode of an excavator, and shows engine outputs according to the excavator work. Examples of working mode may be P-mode, H-mode, G1-mode, G2-mode, F1-mode, and the like. The working modes are to fix the engine revolutions of the engine 10. For example, if the working mode is set to P-mode, the engine 10 is set to 1900 RPM. If there is no load in the engine 10, the engine revolution is kept 1900 RPM, while if the load becomes larger due to the use of the excavator, the engine revolutions becomes a little lower than 1900 RPM, and more fuel is injected into the engine 10 through the self control system to keep the engine revolutions of 1900 RPM.

Figure 3A:
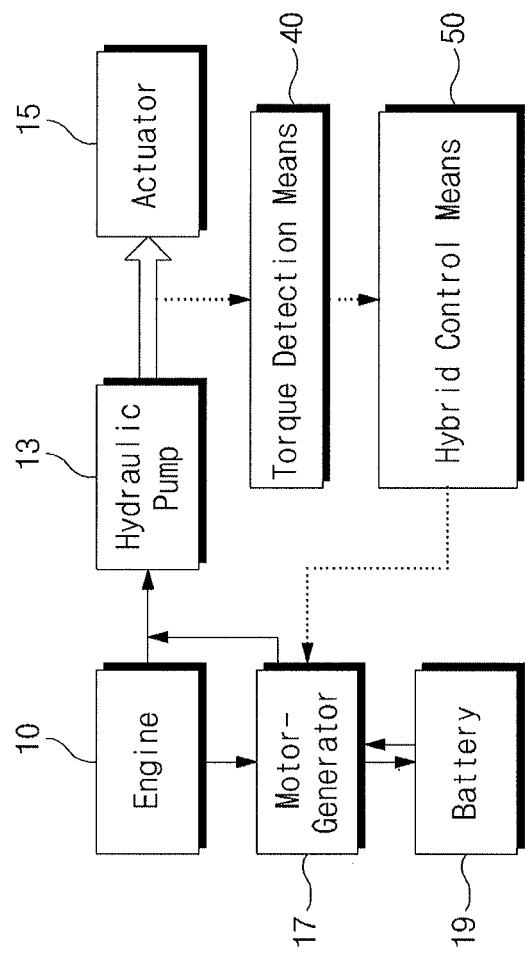
FIGS. 3A and 3B are schematic block diagrams illustrating the configuration of a system for controlling engine revolutions for a hybrid construction machine according to an embodiment of the present invention.

FIG. 3A is a schematic block diagram illustrating the configuration of a system for controlling engine revolutions for a hybrid construction machine according to an embodiment of the present invention.

Referring to FIG. 3A, in the system for controlling engine revolutions for a hybrid construction machine, the control system for a hybrid construction machine includes an engine 10, a hydraulic pump 13 for driving a hydraulic actuator 15, a motor-generator 17 which is driven by the engine 10 to generate electricity and to drive the hydraulic pump 13 as a motor supplementing the engine 10, and an energy storage device 19 which is charged with generated electric energy and which supplies the electric energy for motor operation of the motor-generator 17. The system for controlling engine revolutions for a hybrid construction machine further include a torque detection means 40 for detecting the output torque of the hydraulic pump 13 that is required to drive the hydraulic actuator 15, and a hybrid control means 50.

The torque detection means 40 detects the output torque of the hydraulic pump that is required to drive the hydraulic actuator 15. The torque required to drive the hydraulic actuator 15 corresponds to the output provided from the hydraulic pump 13. Preferably, the torque detection means 70 detects the output torque output from the hydraulic pump 13 through the adjustment of a swash plate 14. Also, the torque that is necessary for the system may be detected by detecting the opening area or the output of a main control valve (MCV) 7. Referring to FIG. 2, the opening area of the main control valve (MCV) 7 is adjusted in accordance with the output of a pilot value 6 through a user's operation of a lever 5. Also, the output of the hydraulic pump 13 can be directly controlled by adjusting the swash plate 14 of the hydraulic pump 13 through a valve electronic control unit (not illustrated) in accordance with the output of the pilot valve 6 through the user's operation of the lever 5. The flow rate discharged from the hydraulic pump 13 is adjusted according to the opening area of the MCV 7 to be transferred to respective hydraulic systems, or is adjusted by the swash plate 14 that is controlled by the valve electronic control unit (not illustrated) to output torque that is required, for the construction machine, for example, the excavator.

The hybrid control means 50, if the change of the output torque of the hydraulic pump 13 detected by the torque detection means 40 exceeds a predetermined level and it is determined that an engine revolution drop will occur in the engine 10, controls the motor operation of the motor-generator 17 to supplement the output of the engine 10.

FIG. 4 illustrates use areas of the engine in respective modes. Although use areas in several modes are illustrated in FIG. 4, one mode is fixedly used for an actual excavator work for several hours. If load is abruptly increased during working, that is, if the torque that is required to drive the hydraulic actuator 15 is abruptly increased, the revolutions (RPM) of the engine 10 are considerably lowered. Even an excavator in the related art adopts means for preventing such lowering of engine revolution, and for example, the lowering of the engine revolution during working is limited to 100 RPM. In the case of the hybrid construction machine according to an embodiment of the present invention, the operation response speed of the motor-generator 17 attached to the engine 10 is much faster than that of the engine 10, and thus the revolution (RPM) drop of the engine 10 can be prevented by adjusting the output of the motor-generator 17.

Preferably, if it is expected that the engine revolutions are lowered for more than 100 RPM, it is determined that the revolution drop of the engine 10 will occur. Referring to FIG. 4, for example, if it is assumed that the hydraulic actuator 15 is operated by an output of about 30 kW that is received in H-mode, and the output torque of the hydraulic pump 13 is abruptly increased from about 150 Nm to about 500 Nm due to a required load of an output of 90 kW, it is expected that the engine revolutions in the H-mode is lowered from about 1800 RPM to 1700 RPM. In this case, the required output torque of the hydraulic pump 13 is compensated for by heightening the output of the motor-generator 17 by the hybrid control means 50, and thus the revolution drop of the engine 10 is prevented.

In another embodiment of the present invention, the hybrid control means 50 controls the motor operation of the motor-generator 17 so as to supplement the output of the engine 10 if the change of the output torque of the hydraulic pump 13 exceeds the predetermined level due to an abrupt increase of load during working and thus it is determined that the engine revolution drop is occurring. That is, by operating the motor-generator 17 as a motor to supplement the output of the engine 10, the revolutions of the engine 10 is kept roughly constant even if an abrupt output increase is required, and thus the abrupt output can be obtained with the revolution (RPM) drop of the engine 10 prevented.

For example, in the case of the engine revolution drop occurring due to an abrupt operation of the excavator, the output torque of the hydraulic pump 13 that is required in the hydraulic actuator 15 is calculated in advance, and if the occurrence of the revolution drop is predicted, the motor-generator 17 is driven as a motor to add the output to the engine 10, and thus the engine revolution drop is prevented.

Figure 3B:
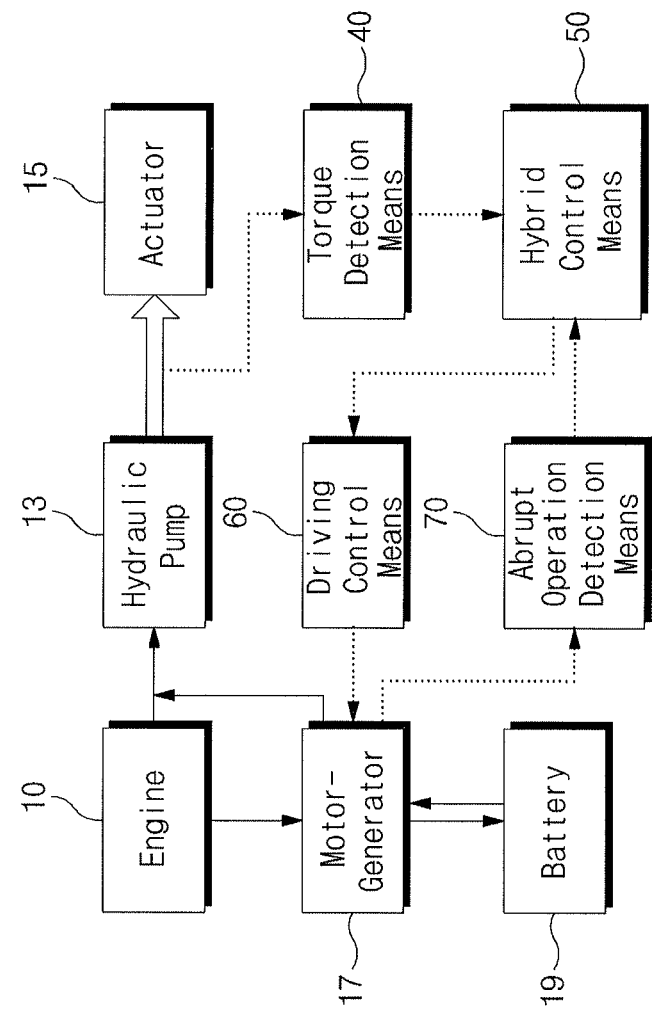

FIG. 3B is a schematic block diagram illustrating the configuration of a system for controlling engine revolutions for a hybrid construction machine according to another embodiment of the present invention.

In a hybrid construction machine system, if the motor-generator 17 attached to the engine 10 is abruptly operated, the engine revolution drop may occur. Referring to FIG. 3B, the system for controlling engine revolutions according to an embodiment of the present invention further includes a driving control means for controlling the power generation or the motor operation of the motor-generator 17, and an abrupt operation detection means 70 for detecting whether motor-generator 17 is abruptly operated.

The hybrid control means 50 smoothly processes an abrupt operation signal of the motor-generator 17 and supplies the processed signal to the driving control means 60 if the change of the output torque of the hydraulic pump 13 that is required according to the abrupt operation of the motor-generator 17 detected by the abrupt operation detection means 70 exceeds the predetermined level and thus it is determined that the engine revolution drop will occur. That is, in this embodiment of the invention, by distorting a predetermined amount of the driving signal of the motor-generator 17 and smoothly applying the driving signal, the engine revolution (RPM) drop is prevented.

Next, a method for controlling engine revolutions for a hybrid construction machine according to another embodiment of the present invention will be described. The explanation of portions overlapping the explained portions of the system for controlling engine revolutions for a construction machine according to an embodiment of the present invention as described above will be omitted. The method for controlling engine revolutions for a hybrid construction machine is applied to the control system for a hybrid construction machine which includes an engine 10, a hydraulic pump 13 which is driven by the engine 10 to drive a hydraulic actuator 15 with discharged hydraulic fluid, a motor-generator 17 which is driven by the engine 10 to generate electricity and to drive the hydraulic pump 13 as a motor supplementing the engine 10, and an energy storage device 19 which is charged with electric energy generated by the motor-generator 17 and which supplies the electric energy for motor operation of the motor-generator 17.

FIG. 5 is a flowchart illustrating a method for controlling engine revolutions for a hybrid construction engine output if it is determined that the engine revolution drop will occur in the drop determination step S200.

In a preferred embodiment of the present invention, in the drop determination step S200, the possibility of generating an engine revolution drop is determined if the change of the output torque of the hydraulic pump 13 due to an abrupt increase of load during the operation exceeds a predetermined level.

FIG. 6 is a flowchart illustrating a method for controlling engine revolutions for a hybrid construction machine according to still another embodiment of the present invention.

In a hybrid construction machine system, if the motor-generator 17 attached to the engine 10 is abruptly operated, the engine revolution drop may occur. Referring to FIG. 6, the method for controlling engine revolutions according to still another embodiment includes an abrupt operation detection step S500, a torque calculation step S1000, a drop determination step S2000, and a hybrid control step S3000.

In the abrupt operation detection step S500, it is detected whether the motor-generator 17 is abruptly operated.

In the torque calculation step S1000, the output torque of the hydraulic pump 13, which is required in accordance with the abrupt operation of the motor-generator 17 that is detected in the abrupt operation detection step S500, is calculated.

In the drop determination step S2000, the possibility of generating the engine revolution drop of the engine 10 is determined if the change of the output torque of the hydraulic pump 13 calculated in the torque calculation step S1000 exceeds a predetermined level.

In the hybrid control step S3000, the motor operation of the motor-generator 17 is controlled by smoothly processing the abrupt operation signal of the motor-generator 17 if it is determined that the engine revolution drop of the engine 10 will occur in the drop determination step S2000.

As described above, the preferred embodiments of the present invention have been described in detail with reference to the accompanying drawings. The aspects and features of the present invention and methods for achieving the aspects and features will be apparent by referring to the embodiments as described above with reference to the accompanying drawings. However, the present invention is not limited to the embodiments as described above, but can be implemented in diverse forms. Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for controlling engine revolutions in a control system for a hybrid construction machine, including an engine, a hydraulic pump which is driven by the engine to drive a hydraulic actuator with discharged hydraulic fluid, a motor-generator which is driven by the engine, to generate electricity and to drive the hydraulic pump as a motor supplementing the engine, and an energy storage device which is charged with electric energy generated by the motor-generator and which supplies the electric energy for motor operation of the motor-generator, the method comprising:
    a torque detection step of detecting an output torque of the hydraulic pump that is required to drive the hydraulic actuator;
    a drop determination step of determining the possibility of generating an engine revolution drop if the change of the output torque of the hydraulic pump detected in the torque detection step exceeds a predetermined level; and
    a hybrid control step of controlling the motor operation of the motor-generator so as to supplement the engine output if it is determined that the engine revolution drop will occur in the drop determination step,
    wherein the drop determination step determines the possibility of generating the engine revolution drop if the change of the output torque of the hydraulic pump exceeds the predetermined level due to an abrupt increase of load during operation.

* * * * *